United States Patent
Ji et al.

(10) Patent No.: US 8,178,225 B2
(45) Date of Patent: May 15, 2012

(54) BATTERY AND PREPARATION METHOD THEREOF

(75) Inventors: Yingliang Ji, Shenzhen (CN); Jianhua Zhu, Shenzhen (CN); Xi Shen, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 761 days.

(21) Appl. No.: 12/324,239

(22) Filed: Nov. 26, 2008

(65) Prior Publication Data

US 2009/0142662 A1     Jun. 4, 2009

(30) Foreign Application Priority Data

Nov. 29, 2007 (CN) .......................... 2007 1 0196570

(51) Int. Cl.
    *H01M 2/00*     (2006.01)
    *H01M 10/50*     (2006.01)

(52) U.S. Cl. .......................... 429/62; 429/120; 29/623.4

(58) Field of Classification Search .................... 429/53, 429/62, 120; 29/623.4; 252/78.3
See application file for complete search history.

(56) References Cited

U.S. PATENT DOCUMENTS

| | | | | |
|---|---|---|---|---|
| 5,173,374 | A | * | 12/1992 | Tiedemann et al. ............ 429/53 |
| 5,399,615 | A | * | 3/1995 | Bosch et al. ............. 252/78.3 X |
| 5,569,552 | A | * | 10/1996 | Rao et al. .................. 429/120 X |
| 5,681,668 | A | * | 10/1997 | Reed et al. ................ 429/120 X |
| 5,925,288 | A | * | 7/1999 | Umamori et al. ........ 252/78.3 X |
| 6,377,432 | B1 | | 4/2002 | Hashimoto |
| 6,482,542 | B1 | * | 11/2002 | Takaki et al. ................. 429/120 |
| 2002/0146620 | A1 | | 10/2002 | Connell |
| 2003/0134189 | A1 | | 7/2003 | Kanai et al. |
| 2005/0214634 | A1 | | 9/2005 | Kim |
| 2005/0238930 | A1 | | 10/2005 | Yoshida et al. |
| 2005/0277019 | A1 | | 12/2005 | Riley, Jr. et al. |
| 2006/0110657 | A1 | | 5/2006 | Stanton et al. |

FOREIGN PATENT DOCUMENTS

| | | |
|---|---|---|
| CN | 1185664 A | 6/1998 |
| CN | 1241305 A | 1/2000 |
| CN | 2433734 Y | 6/2001 |
| CN | 1319901 A | 10/2001 |
| CN | 97117532.2 | 7/2002 |
| CN | 1442927 A | 9/2003 |
| CN | 97120801.8 | 12/2003 |
| CN | 200420026421.3 | 4/2004 |
| CN | 1497753 A | 5/2004 |
| CN | 200420034061.1 | 6/2004 |
| CN | 1540792 A | 10/2004 |
| CN | 2679860 Y | 2/2005 |
| CN | 1604357 A | 4/2005 |
| CN | 1610168 | 4/2005 |

(Continued)

*Primary Examiner* — Stephen J. Kalafut

(74) *Attorney, Agent, or Firm* — Brinks Hofer Gilson & Lione

(57) ABSTRACT

In one aspect, a battery comprises a battery main body, a protective jacket that surrounds the battery main body, and a cooling medium disposed between the protective jacket and the battery main body. In another aspect, a battery comprises a battery main body, a protective jacket that surrounds and connects to the battery main body, and a cooling medium disposed between the protective jacket and the battery main body. The cooling medium has a specific heat capacity of about 1-5 kJ $kg^{-1}K^{-1}$. In yet another aspect, a method for preparing a battery comprises providing a protective jacket, placing a battery main body in the protective jacket, and disposing a cooling medium between the protective jacket and the battery main body.

18 Claims, 1 Drawing Sheet

FOREIGN PATENT DOCUMENTS

| | | |
|---|---|---|
| CN | 200520071106.7 | 4/2005 |
| CN | 2704119 Y | 6/2005 |
| CN | 2717037 | 8/2005 |
| CN | 2717038 Y | 8/2005 |
| CN | 1716658 A | 1/2006 |
| CN | 1738096 A | 2/2006 |
| CN | 1750295 | 3/2006 |
| CN | 03103954.5 | 3/2006 |
| CN | 1773747 A | 5/2006 |
| CN | 1783576 A | 6/2006 |
| CN | 1841820 A | 10/2006 |
| CN | 1841831 A | 10/2006 |
| CN | 1841834 A | 10/2006 |
| CN | 1855608 A | 11/2006 |
| CN | 2849999 Y | 12/2006 |
| CN | 1941458 A | 4/2007 |
| CN | 1949580 A | 4/2007 |
| CN | 1976095 Y | 6/2007 |
| CN | 101088192 A | 12/2007 |
| CN | 200993972 Y | 12/2007 |
| CN | 200510092257.5 | 2/2008 |
| EP | 1780819 A1 | 5/2007 |
| JP | 5-21086 | 1/1993 |
| JP | 7-169452 A | 7/1995 |
| JP | 11067278 A | 3/1999 |
| JP | 11-204130 A | 7/1999 |
| JP | 11-312512 A | 9/1999 |
| JP | 2001085042 A | 3/2001 |
| JP | 2001-126683 | 5/2001 |
| JP | 2001-283940 A | 10/2001 |
| JP | 2001338628 A | 12/2001 |
| JP | 2002-260745 A | 9/2002 |
| JP | 2002-329530 | 11/2002 |
| JP | 2006-173095 | 11/2002 |
| JP | 2003 168405 A | 6/2003 |
| JP | 2003288882 A | 10/2003 |
| JP | 2004-253262 | 9/2004 |
| JP | 2004-327311 | 11/2004 |
| JP | 2005-71640 A | 3/2005 |
| JP | 2005-190885 | 7/2005 |
| JP | 2005-251617 | 9/2005 |
| JP | 2006-79960 A | 3/2006 |
| JP | 2006-294531 A | 10/2006 |
| JP | 2007-194035 A | 8/2007 |
| JP | 2008-123800 | 5/2008 |
| JP | 2008-181765 | 8/2008 |
| JP | 2008-181822 | 8/2008 |
| WO | WO 2008/144994 A1 | 12/2008 |

* cited by examiner

BATTERY AND PREPARATION METHOD THEREOF

The present application claims priority to Chinese Patent Application No. 200710196570.2, filed Nov. 29, 2007, the entirety of which is hereby incorporated by reference.

FIELD OF THE DISCLOSURE

The present disclosure relates to a battery and a preparation method thereof.

BACKGROUND OF THE DISCLOSURE

Batteries, such as lithium ion batteries, have a small size, high energy density, low pollution, and other advantages. For the packaging of many lithium ion batteries, the metal shell is usually covered with a polyethylene terephthalate (PET) or a plastic film. The film provides an attractive appearance and contains labels or printed identification marks. The film also protects the main body of the batteries from abrasion. However, this kind of packaging can not protect the batteries from overheating. In addition, it is a known method to install a pressure relief valve on the shell of the battery cell to improve safety. When the internal pressure is high, the valve will open and release the internal pressure to prevent explosion. However, the hot material in the battery will spray out via the valve and contaminate the outer environment. When the internal flammable materials spray out and contact with air, it may cause fire.

SUMMARY OF THE DISCLOSURE

In one aspect, a battery comprises a battery main body, a protective jacket that surrounds the battery main body, and a cooling medium disposed between the protective jacket and the battery main body.

In another aspect, a battery comprises a battery main body, a protective jacket that surrounds and connects to the battery main body, and a cooling medium disposed between the protective jacket and the battery main body. The cooling medium has a specific heat capacity of about 1-5 kJ kg$^{-1}$K$^{-1}$.

In yet another aspect, a method for preparing a battery comprises providing a protective jacket, placing a battery main body in the protective jacket, and disposing a cooling medium between the protective jacket and the battery main body.

DETAILED DESCRIPTION OF THE DISCLOSURE

Figure 1:
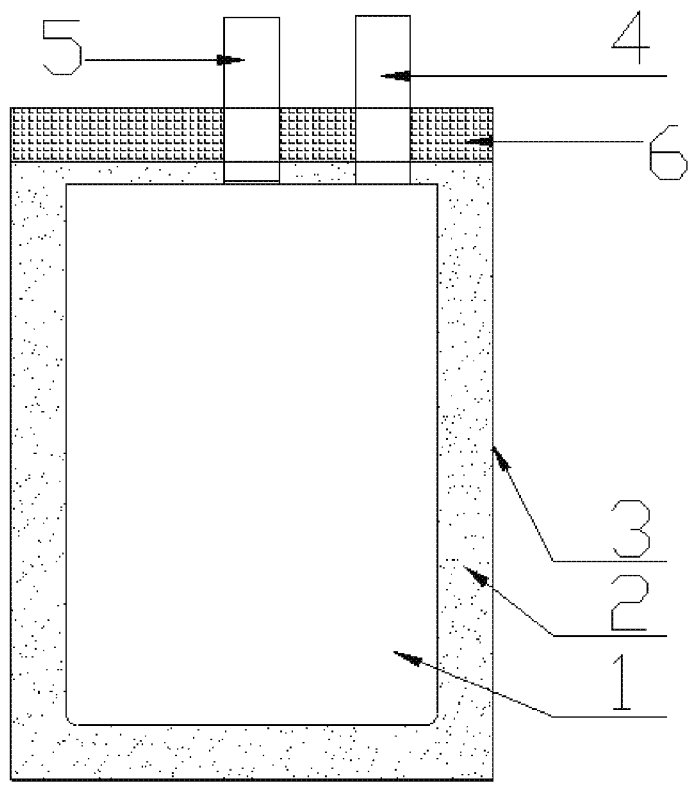
FIG. 1 is the front view of a battery according to one embodiment.
Figure 2:
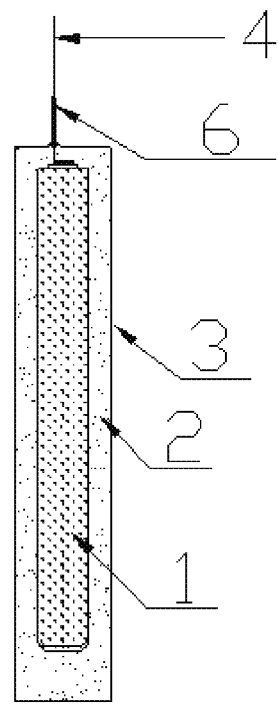
FIG. 2 is the side view of the battery shown in FIG. 1.

FIG. 1 and FIG. 2 are the front view and the side view of a cuboid-shape battery according to one embodiment. The battery comprises a battery main body (1), a protective jacket (3), and a cooling medium (2) disposed between the main body (1) and the protective jacket (3).

The battery main body can be any battery main body known to those skilled in the art. For example, a main body of a lithium ion battery can be used. The main body of a lithium ion battery may comprise a cell core and a non-aqueous electrolyte. The cell core may comprise a positive plate, a negative plate, and a separator disposed between the positive plate and negative plate. The positive plate and the negative plate are respectively connected with a positive tab and a negative tab. The positive tab and the negative tab are respectively used as the positive terminal and the negative terminal of the main body.

The battery main body (1) comprises a positive and a negative tab (not shown in the figures). The positive and negative tabs can directly protrude from the protective jacket (3), or electrically connect to a corresponding positive external tab (4) or negative external tab (5). The external tabs protrude from the protective jacket (3). The positive and negative tabs, or the external tabs are fixedly connected with the protective jacket, but electrically insulated from the protective jacket. The protective jacket is sealed. The connecting method can be any connecting method known in the art. Preferred methods include, but are not limited to, plastic welding, resistance point welding, ultrasonic welding and laser welding. The material of the external tabs can be any material well-known to those skilled in the art. For example, Al—Ni alloy may be used in the positive tab, and Ni may be used in the negative tab.

The battery main body (1) may further comprise a safety valve (not shown in the figure). When the safety valve opens in response to a high internal pressure in the battery main body, the cooling medium flows into the main body through the valve. As a result, the internal temperature of the battery may decrease. Meanwhile the cooling medium may isolate the battery from the outside oxygen to avoid any fire.

The cooling medium (2) for the battery preferably has good heat absorbing and electrical insulating properties. Also it preferably is a nonflammable and non-explosive material. Preferably, the cooling medium has a specific heat capacity of about 1-5 kJ kg$^{-1}$K$^{-1}$. Preferably, it has an ignition point and a flash point both higher than about 200° C. The cooling medium may be a gas, a liquid or a solid material that meets the aforementioned requirements. Preferred examples include, but are not limited to, silicone oils and their modified products. For example, the cooling medium (2) can be phenyl silicone oil, or dimethicone. Preferably, the weight of the cooling medium is about 10%-200% of the weight of the battery main body.

The protective jacket can be made of a corrosion resistant material with a certain mechanical strength. These properties may ensure the mechanical strength of the battery and prevent the protective jacket from reacting with the cooling medium. The protective jacket (3) can be made of a metal shell, a plastic shell, a metal film, a plastic film or a metal-plastic composite film. The shape and size of the protective jacket (3) is determined by the battery main body. Preferably, the shape of the protective jacket (3) is preferably similar to the shape of the battery main body. The size of the protective jacket (3) is larger than the size of the main body. The ratio of the sizes of the protective jacket and the main body should be determined by the heat-generation property of the main body. For the main body with a high heat-generation, the protective jacket should be large enough to contain a substantial amount of cooling medium such that the heat dissipation of the main body may be more efficient.

When finishing the preparation of the battery, the opening edge of the protective jacket (3) is sealed and the sealing (6) is formed. The method of sealing can be any suitable method known to the art, such as hot plate welding, ultrasonic welding, adhesive agent binding and other sealing methods. Preferably, hot plate welding is used.

According to another embodiment, a method for preparing a battery is provided. The method comprises providing a protective jacket; placing a battery main body in the protective jacket; and disposing a cooling medium between the protective jacket and the battery main body. The protective jacket is then sealed.

Preferably, the preparation method comprises forming a protective jacket according to the shape and the size of a battery main body; surrounding the battery main body with the protective jacket; and partially sealing the protective jacket to leave at least one opening. The preparation method may further comprise introducing the cooling medium into the protective jacket via the opening; and sealing the opening.

The preparation method may further comprises connecting fixedly a tab of the battery main body with the protective jacket; wherein a terminal of the tab protrudes from the protective jacket; and wherein the tab is electrically insulated from the protective jacket.

The preparation method may further comprises connecting fixedly a tab of the battery main body with an external tab; connecting fixedly the external tab with the protective jacket; wherein a terminal of the external tab protrudes from the protective jacket; and wherein the external tab is electrically insulated from the protective jacket.

If only one opening is reserved on the protective jacket, the protective jacket may be vacuumed via the opening so that the cooling medium may be injected into the protective jacket easily. If more than one opening is reserved on the said protective jacket, the air in the protective jacket may be released by the other openings during the injection process of the cooling medium. Therefore the step of vacuuming is not necessary.

Example 1

The present example illustrates a battery according to one embodiment and a method for preparing the same.

Preparation of the Battery Main Body:

To about 100 parts by weight of water were added about 100 parts by weight of natural graphite, about 4 parts by weight of PTFE, and about 4 parts by weight of carbon black. The resulting mixture was stirred uniformly to afford a negative electrode slurry. The slurry was coated uniformly on a copper foil. The coated foil was dried at about 90° C. Then the dried foil was rolled and pressed. The foil was cut into a negative electrode sheet with a length of about 505 mm, a width of about 45 mm, and a thickness of about 0.101 mm. The obtained negative electrode sheet contains about 2.3 grams of natural graphite. A nickel sheet with a size of about 20 mm×5 mm was welded onto the negative electrode sheet as a negative electrode tab.

To about 60 parts by weight of N-methyl-2-pyrrolidone (NMP) were added about 100 parts by weight of LiFePO$_4$, about 2 parts by weight of PTFE, and about 4 parts by weight of acetylene black. The resulting mixture was stirred uniformly to provide a positive electrode slurry. The slurry was coated uniformly on an aluminum foil. The coated foil was dried under about 150° C. Then the foil was rolled and pressed. The foil was cut into a positive electrode sheet with a length of about 480 mm, a width of about 44 mm, and a thickness of about 0.150 mm. The positive electrode sheet contains about 5.5 grams of natural graphite. A nickel sheet with a size of about 20 mm×5 mm was welded onto the negative electrode sheet as a positive electrode tab.

The positive electrode sheet, the negative electrode sheet, and a polypropylene (PP) separator were coiled to form a core. The core was disposed into a rectangle battery shell, which has a size of about 6 mm×45 mm×50 mm. An electrolyte was prepared by dissolving LiPF$_6$ into the mixed solvent of ethylene carbonate (EC), dimethyl carbonate (DMC) and ethylmethyl carbonate (EMC). The electrolyte has a LiPF$_6$ concentration of about 1 mol/dm$^3$. The ratio of each solvent is about 1:1:1. The electrolyte was injected into the battery shell by the amount of about 3.8 g/Ah. Then the shell was sealed. One terminal of the positive tab and one terminal of negative tab protrude out of the battery shell, respectively. Thus, a battery main body was obtained.

The weight of the prepared battery main bodies is about 25 g, which is in the allowable error range.

Battery Preparation:

A battery was prepared by using the prepared battery main body.

A protective jacket with a size of about 8 mm×50 mm×55 mm was prepared by using an aluminum plastic film. The protective jacket had an opening with a size of about 8 mm×50 mm. Then two nickel sheets with a size of about 20 mm×5 mm were welded onto the positive and negative tab of the battery main body as a positive and a negative external tab, respectively. Then the battery main body was fixedly placed into the protective jacket through the opening. The protective jacket and the battery tabs were positioned carefully to avoid leaking. The opening was partially sealed by ultrasonic welding to leave an unsealed edge with a length of about 1 mm. Then the protective jacket was vacuumed to about 0.01 MPa. About 15 g of dimethicone was injected into the protective jacket. The specific heat capacity of dimethicone is about 1.7 kJ kg$^{-1}$K$^{-1}$. The unsealed edge was sealed by hot plate welding. Thus, a battery (A) was obtained.

The aforementioned process was repeated to prepare 50 A batteries.

Control Example 1

The present control describes a battery known in the art and a method of preparing the same.

A battery main body was prepared according to the process in Example 1. A battery (B) was obtained by packing the battery main body with a PET film.

The aforementioned process was repeated to prepare 50 B batteries.

10 A batteries and 10 B batteries were selected randomly from the 50 A batteries and the 50 B batteries. The surface temperatures of the selected batteries were measured before and after the batteries were charged. The experiment was performed at room temperature (28° C.). The batteries were charged to about 12 V at a current of about 1 mA. The average temperatures of each set of the batteries were shown in Table 1.

TABLE 1

|  | Before Charging | After Charging | Temperature Difference |
|---|---|---|---|
| Example 1 (Battery A) | 28° C. | 68° C. | 40° C. |
| Control Example 1 (Battery B) | 28° C. | 110° C. | 82° C. |

Under the same testing condition, the temperature of the batteries with the protective jacket and the cooling medium increased about 40° C. after charging. The temperature of the conventional batteries increased about 82° C. There is an about two-fold difference in the increase of the temperature. Thus the batteries according to embodiments of the present disclosure may prevent the batteries from overheating and improve the safety.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery, comprising:
   a battery main body comprising an internal tab with two terminals;
   a protective jacket that surrounds the battery main body; and
   a cooling medium disposed between the protective jacket and the battery main body,
   wherein the internal tab is connected with the protective jacket and is electrically insulated from the protective jacket, and
   wherein one terminal of the internal tab protrudes from the protective jacket.

2. The battery of claim 1, wherein the battery main body has a safety valve.

3. The battery of claim 1, wherein the protective jacket is selected from the group consisting of a metal shell, a plastic shell, a metal film, a plastic film, a metal-plastic composite film, and combinations thereof.

4. The battery of claim 1, wherein the weight of the cooling medium is about 10-200% of the weight of the battery main body.

5. The battery of claim 1, wherein the cooling medium has a specific heat capacity of about 1-5 kJ kg$^{-1}$ K$^{-1}$.

6. The battery of claim 1, wherein the cooling medium has an ignition point higher than about 200° C. or a flash point higher than about 200° C.

7. The battery of claim 1, wherein the cooling medium is selected from a group consisting of a gas, a liquid, a solid material, and combinations thereof.

8. The battery of claim 1, wherein the cooling medium comprises silicone oils or modified silicone oils.

9. The battery of claim 8, wherein the cooling medium is selected from a group consisting of phenyl silicone oil, dimethicone, and combinations thereof.

10. The battery of claim 1, wherein the tab is connected with an external tab; wherein the external tab is connected with the protective jacket, and is electrically insulated from the protective jacket; and wherein the external tab protrudes from the protective jacket.

11. A battery, comprising:
    a battery main body comprising an internal tab with two terminals;
    a protective jacket that surrounds and connects to the battery main body; and
    a cooling medium disposed between the protective jacket and the battery main body,
    wherein the internal tab is connected with the protective jacket and is electrically insulated from the protective jacket,
    wherein one terminal of the internal tab protrudes from the protective jacket, and
    wherein the cooling medium has a specific heat capacity of about 1-5 kJ kg$^{-1}$K$^{-1}$.

12. A method for preparing a battery, comprising:
    providing a protective jacket;
    placing a battery main body in the protective jacket, the battery main body comprising an internal tab and the internal tab comprising a terminal;
    disposing a cooling medium between the protective jacket and the battery main body; and
    connecting the internal tab with the protective jacket such that the terminal of the internal tab protrudes from the protective jacket.

13. The method of claim 12, wherein the placing comprises:
    surrounding the battery main body with the protective jacket; and
    partially sealing the protective jacket to leave at least one opening.

14. The method of claim 13, wherein the disposing comprises:
    introducing the cooling medium into the protective jacket through the at least one opening; and
    sealing the at least one opening.

15. The method of claim 12, further comprising:
    vacuuming the space between the protective jacket and the battery main body before disposing the cooling medium.

16. The method of claim 12, wherein the placing method is selected from a group consisting of hot plate welding, ultrasonic welding, adhesive agent binding, and combinations thereof.

17. The method of claim 12, further comprising:
    connecting an external tab with the internal tab; and
    connecting the external tab with the protective jacket such that the external tab protrudes from the protective jacket.

18. The method of claim 12, wherein the connecting method is selected from a group consisting of plastic welding, resistance point welding, ultrasonic welding, laser welding, and combinations thereof.

* * * * *